United States Patent [19]

Tobol

[11] 3,879,553

[45] Apr. 22, 1975

[54] CONTROL OF RICE BLAST WITH 4-HALO-CARBOSTYRILS AND -ISOCARBOSTYRILS

[75] Inventor: Helen K. Tobol, Concord, Calif.

[73] Assignee: The Dow Chemical Company, Midland, Mich.

[22] Filed: Nov. 5, 1973

[21] Appl. No.: 412,945

[52] U.S. Cl. .............................................. 424/258
[51] Int. Cl. .......................... A01n 9/00; A01n 9/22
[58] Field of Search .................. 424/258; 260/289 R

[56] References Cited
UNITED STATES PATENTS
3,624,089  11/1971  Pawloski .................... 260/289 R FOREIGN PATENTS OR APPLICATIONS
46-19076  5/1971  Japan OTHER PUBLICATIONS
J. Am. Chem. Soc., 68, 1810–1812, (1946), Antimalarials, Lutg et al.

*Primary Examiner*—Albert T. Meyers
*Assistant Examiner*—D. W. Robinson
*Attorney, Agent, or Firm*—J. Roger Lochhead

[57] ABSTRACT

4-Halo carbostyrils and -isocarbostyrils and their N-lower alkyl or alkenyl derivatives are effective fungicides. They are of particular value as systemics which are not phytotoxic at the treatment levels required for control of *Piricularia oryzae* (rice blast).

10 Claims, No Drawings

CONTROL OF RICE BLAST WITH 4-HALO-CARBOSTYRILS AND -ISOCARBOSTYRILS

BACKGROUND OF THE INVENTION

According to Japanese Pat. No. 7119076, N-methyl carbostyril (1-methyl-2-oxoquinoline) and N-methyl isocarbostyril (1-oxo-2-methyl isoquinoline) are active against plant diseases, particularly against rice blast, and are of low toxicity to plants, fish and mammals. U.S. Pat. No. 3,624,089 discloses 1-(2-propynyl)-4-R-carobstyrils, where R is H or $C_1$ to $C_4$ alkyl, as being herbicides and fungicides.

According to Hamada et al., Yakugaku Zasshi 82, 1592-6 (1962); C.A. 59: 564 g, 4-methyl-6-chlorothiocarbostyril and 4-methyl-6-chlorocarbostyril are fungicidally active against various Candida organisms.

4-Halo-carbostyrils and -isocarbostyrils are known compounds, but no investigation of them as fungicides has been reported in the literature.

SUMMARY OF THE INVENTION

The surprising discovery has now been made that substitution of halogen in the 4-position of certain carbostyrils and isocarbostyrils results in reduced phytotoxicity and increased fungicidal activity, particularly systemic activity against rice blast.

In its broadest aspect, the invention comprises applying to the locus of a plant or plant seed a fungicidally effective amount of one or more 4-halo-carbostyril or -isocarbostyril compounds defined respectively by the following structures

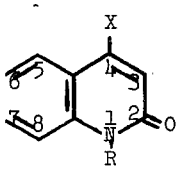 and 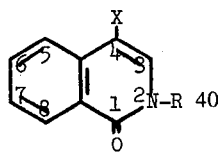

wherein X is Br or Cl, and R is H or an alkyl or alkenyl radical of from one to four carbons.

In a narrower aspect, the invention comprises application to the locus of a rice plant an amount of one or more of the above compounds which is effective against rice blast. In another aspect the invention comprises adding a fungicidally effective amount of one or more of the above defined compounds to the soil and/or water by which a plant is or will be nourished. In a preferred embodiment of the latter procedure, the plant is a rice seedling and the amount of the compound or compounds applied is such as to be effective against rice blast.

Among the above defined compounds, those in which X- is Cl are preferred and particularly those compounds in which X is Cl and R is —$CH_3$ or —H. Within the latter categories, 4-chloro-N-methylcarbostyril and 4-chloro-isocarbostyril are outstanding, especially for control of rice blast by application to the soil and/or water by which a rice plant is or will be nourished.

DETAILED DESCRIPTION

The compounds of the present invention are prepared by known methods from 1,4-dihaloquinolines or -isoquinolines.

| Compound | Reference |
|---|---|
| 4-chloro-N-methylcarbostyril | J.A.C.S. 68, 1810 (1946) |
| 4-chlorocarbostyril } 4-chloroisocarbostyril } | J. Org. Chem. 23, 1071(1958) |

Preparations

EXAMPLE 1

4-Chloroisocarbostyril and 4-chloro-N-methyl isocarbostyril:

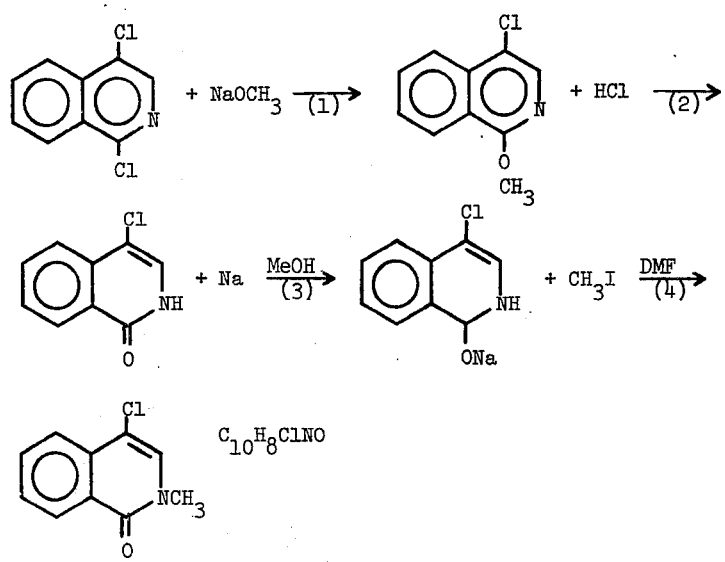

4-Chloro-N-methylisocarbostyril was produced by the conversion of 1,4-dichloroisoquinoline to 4-chloro-1-methoxy-iosquinoline with sodium in methanol, followed by the cleavage of the ether with hydrochloric acid to produce 4-chloroisocarbostyril. The latter styril in turn was methylated by conversion to the sodium salt and methylation with methyl iodide in DMF.

6.0 Grams (0.0303m) of 1,4-dichloroisoquinoline was put in a 50 ml. bomb with 1.0 g. sodium in 15 ml. methanol plus 5 ml. methanol used for rinsing. The bomb was sealed and heated at 100°C. for 1.5 hours. The cooled reaction mixture was poured out into a distilling flask, the bomb rinsed out with $CH_2Cl_2$ and the solvents removed with aspirator vacuum. The product was then washed with water, filtered, rinsed and pressed on a porous plate. This yielded 5.14 g. of the desired compound (by NMR).

4.9 Grams (0.025 m) of the 4-chloro-1-methoxy isoquinoline was put in a 50 ml. bomb with 6 ml. of conc. HCl, sealed and run at 100°C. for 2 hours. The reaction mixture was washed out of the bomb with water, the product filtered out, water washed and dried in an Aberhalden pistol with $CCl_4$ reflux. The dried product was then boiled in n-hexane, filtered hot and again dried in the pistol with $CCl_4$ reflux. An IR scan indicated the desired product had been obtained. The yield was 3.2 g. of 4-chloroisocarbostyril; m.r. 228°–231°C.

For the final step, 3.0 g. (0.0167 m) of the 4-chloroisocarbostyril was stirred in 20 ml. of methanol and a solution of 0.39 g. (0.0167 m) of sodium in 15 ml. of methanol was added. This was taken to reflux and 18 ml. more methanol added to get all of the material in solution. The methanol was then removed and the dry salt was put in solution in 20 ml. of DMF and stirred and heated to 85°C. To this was added the methyl iodide in DMF solution in 2 portions. The first portion was 2.0 g. methyl iodide in 5 ml. DMF and was added over a 3-minute period at which time the temperature rose from 85°C. to 100°C. The reaction mixture was cooled to 74°C. and the second portion consisting of 2.3 g. of methyl iodide in 5 ml. of DMF was added over a 4-minute period. The temperature rose to 79° C. It was then kept between 77°C. and 87°C. for one hour. The reaction mixture was then poured into cold water, the precipitate filtered off, water washed and then taken up in toluene, treated with Norite and crystallized. The product was air dried and an NMR run. This showed a water peak so the sample was put in a drying pistol with toluene reflux. The dry material had an elemental analysis of C = 62.13; H = 4.45; N = 7.02; Cl = 20.46 (theory: C = 62.03; H = 4.16; N = 7.20; Cl = 18.31). A total of 2.5 g. of product was obtained which had a melting point of 133°–6°C.

EXAMPLE 2

In the manner of Example 1 the following compounds are prepared:

| Compound | Melting range, color, form or molecular formula |
| --- | --- |
| 4-bromo-N-methylcarbostyril (85%) <br> 4-bromocarbostyril (15%) | 113–117°C. <br> pale yellow crystals |
| 4-chloro-N-n-butylcarbostyril | 45–47°C. <br> light yellow crystals |
| 4-chloro-N-ethylcarbostyril | 46.5–51.5°C. <br> pale yellow crystals |
| 4-bromo-N-isopropylcarbostyril | $C_{12}H_{12}BrNO$ |
| 4-chloro-N-crotylisocarbostyril | $C_{13}H_{12}ClNO$ |
| 4-chloro-N-allylcarbostyril | $C_{12}H_{10}ClNO$ |
| 4-bromo-N-(sec-butyl)isocarbostyril | $C_{13}H_{14}BrNO$ |
| 4-chloro-N-(t-butyl)carbostyril | $C_{13}H_{14}ClNO$ |

MANNER OF USE

The compounds of the present invention are most useful as agricultural fungicides. As such, they may be applied to plant parts, such as seeds, stems or leaves, or to the soil and/or water in which a plant is or will be growing. For such purposes, the 4-halocarbostyrils or -isocarbostyrils may be used (in the technical or pure form) as prepared, as solutions or as formulations.

The compounds are usually taken up in a carrier or are formulated so as to render them suitable for subsequent dissemination as pesticides. For example, they may be formulated as wettable powers, emulsifiable concentrates, dusts, granular formulations, aerosols or flowable emulsion concentrates. In such formulations, the compounds are extended with a liquid or solid carrier and, when desired, suitable surfactants are incorporated.

It is usally desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1967 Annual."

The compounds of this invention may be dissolved in a water-miscible liquid, such as methanol, ethanol, isopropanol, acetone, dimethylformamide or dimethyl sulfoxide or mixtures of these with water and such solutions extended with water. The concentration of the solution may vary from 2 to 80 percent with a preferred range being 25 to 55 percent.

For the preparation of emulsifiable concentrates, the compound may be dissolved in organic solvents, such as xylene, pine oil, orthodichlorobenzene, methyl oleate, or a mixture of solvents, together with an emulsifying agent which permits dispersion of the pesticide in water. The concentration of the active ingredient in emulsion concentrates is usually 10 to 25 percent and in flowable emulsion concentrates, this may be as high as 75 percent.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20 to 98 percent, preferably 40 to 75 percent.

Dusts are prepared by mixing the compounds with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20 to 80 percent of the active ingredient are commonly made and are subsequently diluted to 1 to 10 percent use concentration.

The compounds can be applied as fungicidal sprays by methods commonly employed, such as conventional high-gallonage hydraulic sprays, low gallonage sprays, airblast spray, aerial sprays and dusts. The dilution and rate of application will depend upon the type of equipment employed, the method of application and diseases to be controlled, but the amount is usually 0.1 lb. to 10 lbs. per acre of the active ingredient.

As a seed protectant, the amount of toxicant coated on the seed is usually at a dosage rate of about 0.1 to 5 ounces per hundred pounds of seed. As a soil fungicide the chemical may be incorporated in the soil or applied to the surface usually at a rate of 0.1 to 10 lbs. per acre. As a foliar fungicide the toxicant is usually applied to growing plants at a rate of 0.25 to 5 pounds per acre.

The compounds of this invention are also of interest when mixed with fertilizers and fertilizing materials. Such mixtures with fertilizers may be made in a variety of ways. For example, liquid formulations may be sprayed onto particles of mixed fertilizer or of fertilizer ingredients, such as ammonium sulfate, ammonium nitrate, ammonium phosphate, potassium chloride or sulfate, calcium phosphate or urea, singly or in admixture. Also, the toxicants and the solid fertilizing materials may be admixed in mixing or blending equipment. Similarly, a solution of toxicants in a volatile solvent may be applied to particles of fertilizer or fertilizer ingredients. A particularly useful form in which the toxicants are incorporated with fertilizers is in granular formulations. This type of solid composition serves a dual purpose in providing fertilizing material for the rapid growth of desired plants and at the same time helps control fungal diseases in one operation without the necessity of separate applications.

The compounds can also be employed in conjunction with other fungicides or with insecticides, miticides, bird repellants and comparable pesticides.

Where the compounds are to be employed as systemics by means of root uptake, they may be introduced by several methods into the locus of the roots of the plant to be protected. For example, a suitable solution or dispersion of the compound(s) may be sprayed onto the soil surface and allowed to permeate into the underlying soil. Alternatively, the soil may be taken up in successive portions to a preselected depth, mixed with a suitable formulation of the compound(s) and replaced. In another mode of application, a solution or dispersion of the compound(s) which includes an emulsifying or suspending agent can be metered into irrigation water flowing to the plants to be protected. For protection of rice plants, which are grown in soil which is continuously covered with water, the compound(s) can be applied directly to the paddy water by spraying, dusting or broadcasting of particles - such as fertilizer granules - coated with an appropriate formulation of the compound(s). This can be done before or after the rice seedlings have been planted. Still other methods of application will be apparent to practicing agronomists.

In general practice, the amounts in which the compounds of the invention are employed for systemic control of rice blast range from about 0.05 to about 10.0 pounds per acre.

EXAMPLE 3

Foliar Applications. 4-Chloro-N-methylcarbostyril.

A. 4-Chloro-N-methylcarbostyril was dissolved in acetone at 10,000 parts/million and diluted with 20 percent isopropanol to a concentration of 400 parts/million. A 400 part/million concentrate of phenylmercuric acetate was also prepared in 20 percent isopropanol using a 50 percent wettable powder formulation. The chemicals were applied to rice plants as a spray and when dry, the plants were inoculated with a suspension of rice blast (*Piricularia oryzae*) conidia. The plants were then subjected to suitable environmental conditions and the percent disease control was graded 10 days later.

| Percent Control of Rice Blast at 400 parts/million | |
|---|---|
| Chemical | Percent Control |
| 4-chloro-N-methylcarbostyril | 90 |
| Phenylmercuric acetate | 90 |
| Untreated Check | 0 |

B. 4-Chloro-N-methylcarbostyril was dissolved in acetone at 10,000 parts/million and diluted with 20 percent isopropanol to a concentration of 400 parts/million. A 400 part/million concentrate of Manzate D (ethylenebisdithiocarbamate, manganese salt) was also prepared in 20 percent isopropanol using a commercial 80percent wettable powder formulation. The chemicals were applied to grape seedlings as a spray and when dry, the plants were inoculated with a suspension of grape downy mildew (*Plasmopara viticoli*) conidia. The plants were then subjected to a suitable environmental condition and the percent disease control was graded 7 days later.

| Percent Control of Grape Downy Mildew at 400 parts/million | |
|---|---|
| Chemical | Percent Control |
| 4-chloro-N-methylcarbostyril | 99 |
| Manzate D | 90 |
| Untreated Check | 0 |

C. The chemicals were also applied to tomato plants as a spray and when dry, the plants were inoculated with a suspension of late blight (*Phythora infestans*) conidia. The plants were then subjected to suitable environmental conditions and the percent disease control was graded 5 days later.

| Percent Control of Tomato Late Blight at 400 Parts/Million | |
|---|---|
| Chemical | Percent Control |
| 4-chloro-N-methylcarbostyril | 75 |
| Manzate D | 90 |
| Untreated Check | 0 |

D. A concentrate of 4-chloro-N-methyl carbostyril was prepared from which a 1600, 400, 100 and 25 part/million dilution series was made in 20 percent isopropanol. A similar dilution series was prepared for phenylmercuric acetate in 20 percent isopropanol using the 50 percent wettable powder. These chemicals were applied to rice plants in the form of a spray, and when dry, the plants were inoculated with rice blast. The plants were then subjected to suitable environmental conditions and the percent disease control was graded 10 days later.

| Percent Control of Rice Blast at Indicated Dosage, Parts/Million | | | | |
|---|---|---|---|---|
| Chemical | 1600 | 400 | 100 | 25 |
| 4-chloro-N-methylcarbostyril | 95 | 95 | 87 | 0 |
| Phenylmercuric acetate | 99T | 95SLT | 87 | 64 |
| Untreated Check | 0 | 0 | 0 | 0 |

T = toxic to plants
SLT = slightly toxic.

E. A dilution series was prepared for both compounds as in D, above, except 50 percent wettable powders were used. These were applied to rice plants as a spray. The treated plants were placed outside in the direct sunlight for the rest of the day. Late in the afternoon, the plants were placed in a 65°F. and 100 percent relative humidity biochamber until a fine layer of mist had deposited on the leaves. They were then covered and left in the biochamber overnight. This procedure was continued for 4 days. On the fourth day the plants were inoculated and were then subjected to a suitable environmental condition. The percent disease control was graded 10 days later.

Percent Control of Rice Blast at Indicated Dosage, Parts/Million

Four Days Outside, Day; Moisture Chamber, Nights.

| Chemical | 1600 | 400 | 100 | 25 |
|---|---|---|---|---|
| 4-chloro-N-methylcarbostyril | 97T | 87SLT | 0 | 0 |
| Phenylmercuric acetate | 95T | 79SLT | 75 | 64 |
| Untreated Check | 0 | | | |

T = toxic to plants
SLT = slightly toxic

F. A dilution series as prepared for D was made for each chemical listed below and these were applied to rice plants as a spray. The plants were inoculated with rice blast and subjected to suitable environmental conditions. The percent disease control was graded 10 days later.

Percent Control of Rice Blast at Indicated Dosage, Parts/Million

| Chemical | 2400 | 600 | 150 | 37 |
|---|---|---|---|---|
| 4-chloro-N-methylcarbostyril | 100 | 100 | 93 | 83 |
| N-methylthiocarbostyril | 97T | 83 | 50 | 0 |
| N-methylcarbostyril | 100T | 90SLT | 75 | 50 |
| KITAZIN-P | 100T | 90 | 0 | 0 |
| Untreated Check | 0 | | | |

T = toxic to plants
SLT = slightly toxic

EXAMPLE 4

Systemic application to rice plants. 4-Chloro-N-methylcarbostyril.

A. A 1000 part/million acetone concentrate of 4-chloro-N-methylcarbostyril was prepared. One ml. of this concentrate was added to 50 milliliters of water. The 50 milliliters of water was put in 8-oz. plastic tumblers. Two-inch pots containing 30–40 rice plants, about 3 inches tall, were added to the tumblers. The vermiculite supporting the rice plants contained about 50 milliliters of water and the final total volume in the system was 100 ml. After 24 hours the plants were inoculated with rice blast and were subjected to suitable environmental conditions. The percent disease control was graded 10 days later.

Percent Control of Rice Blast at Indicated Dosage, Parts/Million - Systemic

| Chemical | 100 |
|---|---|
| 4-chloro-N-methylcarbostyril | 100SLT |
| Phenylmercuric acetate | 95T |
| BENLATE | 100 |
| Untreated Check | 0 |

T = toxic to plants
SLT = slightly toxic

B. A 100 part/million acetone concentrate of each of the chemicals listed below was prepared from which 100, 50, 25, 12 and 6 part/million dilution series were made. One milliliter of each concentrate was added to 50 milliliters of water. The plants were treated as above in A.

Percent Control of Rice Blast at Indicated Dosage Parts/Million - Systemic

| Chemical | 10 | 5 | 2.5 | 1.2 | .6 |
|---|---|---|---|---|---|
| 4-chloro-N-methylcarbostyril | 99 | 95 | 83 | 64 | 0 |
| N-methylthiocarbostyril | 0 | 0 | 0 | 0 | 0 |
| BENLATE* | 97 | 93 | 75 | 50 | 0 |
| Untreated Check | 0 | | | | |

*Benlate was used as a 50% wettable powder.

C. Systemic application to rice plants.

A 1000 part/million acetone concentrate of each chemical was prepared from which a 1000, 500, 250 and 12 dilution series was made in acetone. The concentrate was added to 50 milliliters of water. The 50 milliliters was added to an 8-oz. plastic tumber. To the tumbler and water a 2-inch pot containing 30–40 3 inch rice plants was added. The vermiculite supporting the rice plants contained about 50 milliliters of water and the final volume was 100 ml. The plants were inoculated with rice blast 24 hours after application of chemical. The plants were subjected to suitable environmental conditions and the percent disease control was graded 10 days later.

Percent Control of Rice Blast at Indicated Dosage, Parts/Million - Systemic

| Chemical | 100 | 50 | 25 | 12 |
|---|---|---|---|---|
| N-methylthiocarbostyril | 100T | 95SLT | 93 | 83 |
| N-methylcarbostyril | 100T | 95SLT | 83 | 83 |
| 4-chloro-N-methylcarbostyril | — | 100 | 100 | — |
| KITAZIN-P | 100 | 95 | 90 | 83 |
| Untreated Check | 0 | | | |

T = toxic to plants
SLT = slightly toxic

EXAMPLE 5

4-Chloroisocarbostyril. Foliar application to rice plants.

A. A 1000 part/million acetone concentrate of 4-chloroisocarbostyril was prepared from which a final concentration of 100 parts/million in the water was made as in Example 3 F.

Percent Control of Rice Blast at Indicated Dosage, Parts/Million

| Chemical | 100 |
|---|---|
| 4-chloroisocarbostyril | 99 |
| Isocarbostyril | 64SLT |
| BENLATE | 100 |
| Untreated Check | 0 |

SLT = slightly toxic

EXAMPLE 6

Systemic applications. Rice blast control.

Test solutions of each of the chemicals listed below were made up and applied as in Example 4 C.

| Chemical | Percent Control of Rice Blast at Indicated Dosage, Parts/Million - Systemic | | | |
|---|---|---|---|---|
| | 100 | 50 | 25 | 12 |
| N-methylthiocarbostyril | 99T | 95T | 90SLT | 64 |
| N-methylcarbostyril | 100T | 100T | 90SLT | 80 |
| 4-chloro-N-methylcarbostyril | 100SLT | 100 | 100 | 100 |
| 4-chloroisocarbostyril | 97SLT | 90 | 50 | 0 |
| Isocarbostyril | 0 | 0 | 0 | 0 |
| KITAZIN-P | 100SLT | 97SLT | 100 | 97 |
| Untreated Check | 0 | | | |

T = toxic to plants
SLT = slightly toxic

EXAMPLE 7

Comparison of protectant rice blast activities; foliar application.

A 10,000 part/million acetone concentrate was prepared for each chemical. Using these a 1000 part/million dilution was prepared for each in 20 percent isopropanol in water. Four 4-fold serial dilutions were then prepared for each, also in 20 percent isopropanol, giving a 1000, 250, 62, 15 and 4 part/million dilution series. The chemicals were applied to rice seedlings in 2 inch pots in replicate, and the plants were inoculated the following day. The chemicals tested were as follows:

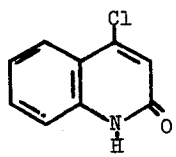
I.
4-chloro-carbostyril

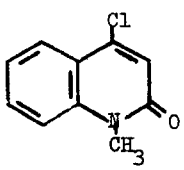
II.
4-chloro-N-methylcarbostyril

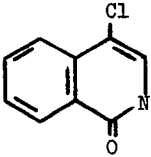
III.
4-chloro-isocarbostyril

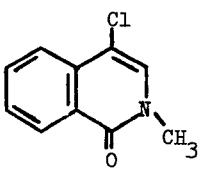
IV.
4-chloro-N-methylisocarbostyril

Results: (10 days after inoculation).

| Compound | 1000 | 250 | 62 | 15 | 4 |
|---|---|---|---|---|---|
| I. | 99 | 97 | 97 | 75 | 75 |
| II. | 99 | 97 | 97 | 67 | 50 |
| III. | 93 | 75 | 25 | 0 | 0 |
| IV. | 95 | 75 | 25 | 0 | 0 |

EXAMPLE 8

Comparison of three isocarbostyril derivatives as systemics for rice blast control.

The chemicals tested are as follows:

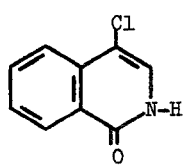
III.

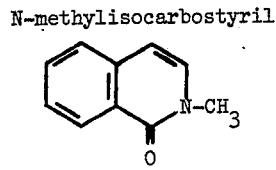
N-methylisocarbostyril
V.

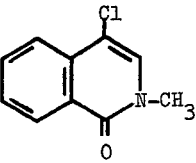
IV.

160 Mg. active of each was weighed into a vial and 4 ml. of acetone was added. Five four-fold serial dilutions were then prepared for each by transferring 1 ml. aliquots to additional vials containing 3 ml. acetone. One ml. of each dilution was then added to each of two 8 oz. tumblers containing 100 ml. H$_2$O giving a 400, 100, 25, 6.2, 1.5 and 0.4 part/million dilution series for each compound, in replicate. A 2 inch pot of small rice seedlings was then placed into each tumbler and the plants were inoculated with rice blast two days later.

Results: (10 days after inoculation).

| Compound | % Control at Concentration (ppm) | | | | | |
|---|---|---|---|---|---|---|
| | 400 | 100 | 25 | 6.2 | 1.5 | 0.4 |
| III. | 100[a] | 100[a] | 99 | 75 | 0 | 0 |
| V. | 100[b] | 75[b] | 0[b] | 0 | 0 | 0 |
| IV. | 100[a] | 90 | 15 | 0 | 0 | 0 |

Phytotoxicity:
[a] a very few lesions on isolated leaves, no stunting;
[b] some leaves dead; severe stunting of plant growth.

EXAMPLE 9

Each of the compounds of preceding Example, 2, when employed as a systemic at a concentration of 400 parts per million in the water in which rice seedlings are growing, gives at least 85 percent control of rice blast and is not more than slightly toxic to the host plants.

I claim:
1. The method of protecting rice plants against rice blast attack which comprises applying to the locus of a rice plant or seed a fungicidally effective amount of a 4-halo-carbostyril or -isocarbostyril compound defined respectively by the following structures

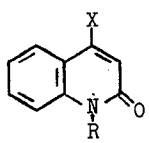 and 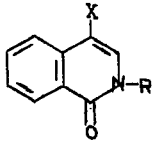

where X is Br or Cl and R is H or an alkyl or alkenyl radical of from one to four carbon atoms.

2. The method of claim 1 in which said compound is added to the soil or water by which said plant or seed is nourished.

3. The method of claim 2 in which said plant is a rice seedling and said compound is applied in an amount effective against rice blast.

4. The method of claim 1 in which X is Cl.

5. The method of claim 1 in which R is –CH$_3$.

6. The method of claim 1 in which X is —Cl and R is H or —CH$_3$.

7. The method of claim 6 in which 4-chloroisocarbostyril is applied to the locus of a rice plant in a fungicidally effective amount.

8. The method of claim 7 in which the 4-chloroisocarbostyril is added to the soil or water by which a rice seedling is nourished.

9. The method of claim 6 in which 4-chloro-N-methylcarbostyril is applied to the locus of a rice plant in a fungicidally effective amount.

10. The method of claim 9 in which the 4-chloro-N-methylcarbostyril is added to the soil or water by which a rice seedling is nourished.

* * * * *